(12) United States Patent
Fujii et al.

(10) Patent No.: US 9,432,083 B2
(45) Date of Patent: Aug. 30, 2016

(54) COMMUNICATION SYSTEM AND TRANSMITTER

(71) Applicant: Kabushiki Kaisha Toshiba, Minato-ku, Tokyo (JP)

(72) Inventors: Shinsuke Fujii, Yokohama Kanagawa (JP); Takuma Aoyama, Fujisawa Kanagawa (JP); Hiroyuki Shibayama, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/637,083

(22) Filed: Mar. 3, 2015

(65) Prior Publication Data

US 2016/0020826 A1    Jan. 21, 2016

(30) Foreign Application Priority Data

Jul. 18, 2014   (JP) .................................. 2014-148163
Oct. 14, 2014   (JP) .................................. 2014-210129

(51) Int. Cl.
*H04B 3/00*        (2006.01)
*H04B 3/54*        (2006.01)

(52) U.S. Cl.
CPC .................................... *H04B 3/544* (2013.01)

(58) Field of Classification Search
CPC ... H04B 3/00; H04L 25/0272; H04L 25/028; H04L 25/0278
USPC .......................................... 375/257–260, 295
See application file for complete search history.

(56) References Cited

U.S. PATENT DOCUMENTS

| | | | | |
|---|---|---|---|---|
| 5,436,559 A | * | 7/1995 | Takagi ................ | G01R 31/2844 324/762.01 |
| 5,457,406 A | * | 10/1995 | Takada ................ | G06F 13/4077 326/30 |
| 5,670,887 A | * | 9/1997 | Andermo ............. | G01D 5/2415 324/660 |
| 6,028,455 A | * | 2/2000 | Yamauchi ........... | H04L 25/0272 327/201 |
| 6,208,161 B1 | * | 3/2001 | Suda ................. | G01R 31/31905 326/30 |
| 6,493,394 B2 | * | 12/2002 | Tamura .............. | G06F 13/4243 326/20 |
| 6,670,830 B2 | * | 12/2003 | Otsuka .............. | G06F 13/4072 326/30 |
| 6,687,039 B2 | * | 2/2004 | Shirai ............... | B82Y 20/00 359/237 |
| 6,714,558 B1 | * | 3/2004 | Patel ................ | H04L 12/40032 370/445 |
| 6,801,054 B2 | * | 10/2004 | Hirano ............. | H03K 19/01721 326/30 |

(Continued)

FOREIGN PATENT DOCUMENTS

| | | |
|---|---|---|
| JP | 2007-037114 A | 2/2007 |
| JP | 2008099236 A | 4/2008 |

(Continued)

*Primary Examiner* — Emmanuel Bayard
(74) *Attorney, Agent, or Firm* — White & Case LLP

(57) ABSTRACT

According to an embodiment, a communication system includes a transmitting electrode, a first transmission line, a transmission circuit, a receiving electrode, a second transmission line and a reception circuit. The first transmission line includes one end connected to the transmitting electrode. The transmission circuit is connected to an other end of the first transmission line and configured to transmit a transmission signal. The receiving electrode is capacitively coupled to the transmitting electrode. The second transmission line includes one end connected to the receiving electrode. The reception circuit is connected to an other end of the second transmission line and configured to receive a reception signal via the receiving electrode and the second transmission line. Characteristic impedances of the first transmission line and the second transmission line are greater than an output impedance of the transmission circuit.

20 Claims, 10 Drawing Sheets

(56) References Cited

U.S. PATENT DOCUMENTS

| | | | |
|---|---|---|---|
| 6,980,021 B1* | 12/2005 | Srivastava | H03K 19/017545 326/136 |
| 7,212,627 B2* | 5/2007 | Choksi | H04B 3/03 379/390.04 |
| 7,375,909 B2* | 5/2008 | Venca | G11B 5/02 360/46 |
| 7,417,818 B2* | 8/2008 | Yuuki | G11B 5/486 360/46 |
| 7,436,737 B2* | 10/2008 | Fukuda | G01D 5/2412 368/28 |
| 7,619,843 B2* | 11/2009 | Contreras | G11B 5/02 360/46 |
| 7,750,851 B2 | 7/2010 | Washiro | |
| 7,786,754 B2* | 8/2010 | Contreras | G11B 5/022 326/30 |
| 8,023,890 B2 | 9/2011 | Washiro | |
| 8,134,239 B2* | 3/2012 | Hiraishi | G11C 5/04 257/784 |
| 8,150,315 B2* | 4/2012 | Canegallo | H04B 5/0012 257/528 |
| 8,280,302 B2* | 10/2012 | Kubono | H04B 5/0012 340/10.51 |
| 8,305,869 B2* | 11/2012 | Kitayama | G11B 7/13 369/124.01 |
| 8,340,576 B2* | 12/2012 | Canegallo | H04B 5/0012 326/83 |
| 8,598,906 B2* | 12/2013 | van der Goes | H03K 19/0005 326/30 |
| 9,147,636 B2* | 9/2015 | Canegallo | H01L 22/34 |
| 9,151,790 B1* | 10/2015 | Hoshtanar | G01R 27/2605 |
| 9,160,307 B2* | 10/2015 | Kato | H03H 9/0571 |
| 2003/0193351 A1* | 10/2003 | Fukui | H03K 19/01721 326/83 |
| 2007/0025436 A1 | 2/2007 | Shumarayev et al. | |
| 2009/0168860 A1* | 7/2009 | Magagni | H04L 7/10 375/226 |
| 2009/0168938 A1* | 7/2009 | Ciccarelli | G06F 13/4077 375/358 |
| 2011/0285473 A1* | 11/2011 | Hauer | H03H 7/383 333/33 |
| 2013/0285467 A1* | 10/2013 | Takahashi | H01F 38/14 307/104 |
| 2013/0324044 A1 | 12/2013 | Kuroda et al. | |
| 2014/0197695 A1* | 7/2014 | Waffenschmidt | H02J 7/025 307/104 |
| 2014/0203663 A1* | 7/2014 | Waffenschmidt | H02J 5/005 307/109 |
| 2014/0210279 A1* | 7/2014 | Van Herpen | H04B 5/0012 307/109 |
| 2014/0211592 A1* | 7/2014 | Miyazawa | B06B 1/0629 367/135 |
| 2014/0375251 A1* | 12/2014 | Sakai | H02J 17/00 320/107 |

FOREIGN PATENT DOCUMENTS

| | | |
|---|---|---|
| JP | 2008-154198 A | 7/2008 |
| JP | 4345849 B2 | 10/2009 |
| JP | 4345851 B2 | 10/2009 |
| JP | 5213087 B2 | 6/2013 |
| WO | 2012/111639 A1 | 8/2012 |

* cited by examiner $fc = 1/(2\pi \cdot Cacc \cdot Z0)$

WORST CONDITION

BEST CONDITION

COMMUNICATION SYSTEM AND TRANSMITTER

CROSS REFERENCE TO RELATED APPLICATION

This application is based upon and claims the benefit of priority from the prior Japanese Patent Application No. 2014-148163 filed on Jul. 18, 2014 and No. 2014-210129 filed on Oct. 14, 2014 in Japan, the entire contents of which are incorporated herein by reference.

FIELD

Embodiments described herein relate generally to a communication system and a transmitter.

BACKGROUND

There is known a communication system including a transmission circuit for transmitting a signal via a transmitting electrode and a reception circuit for receiving a signal via a receiving electrode which is capacitive coupled to the transmitting electrode. The reception circuit restores a transmitted original data pattern from the received signal. In this case, the signal quality of the reception signal is deteriorated due to an intersymbol interference (hereinafter, also referred to as ISI), a reflected signal (reflected wave), or the like.

DETAILED DESCRIPTION

According to an embodiment, a communication system includes a transmitting electrode, a first transmission line, a transmission circuit, a receiving electrode, a second transmission line and a reception circuit. The first transmission line includes one end connected to the transmitting electrode. The transmission circuit is connected to an other end of the first transmission line and configured to transmit a transmission signal. The receiving electrode is capacitively coupled to the transmitting electrode. The second transmission line includes one end connected to the receiving electrode. The reception circuit is connected to an other end of the second transmission line and configured to receive a reception signal via the receiving electrode and the second transmission line. Characteristic impedances of the first transmission line and the second transmission line are greater than an output impedance of the transmission circuit.

Embodiments will now be explained with reference to the accompanying drawings.

First Embodiment

Figure 1:
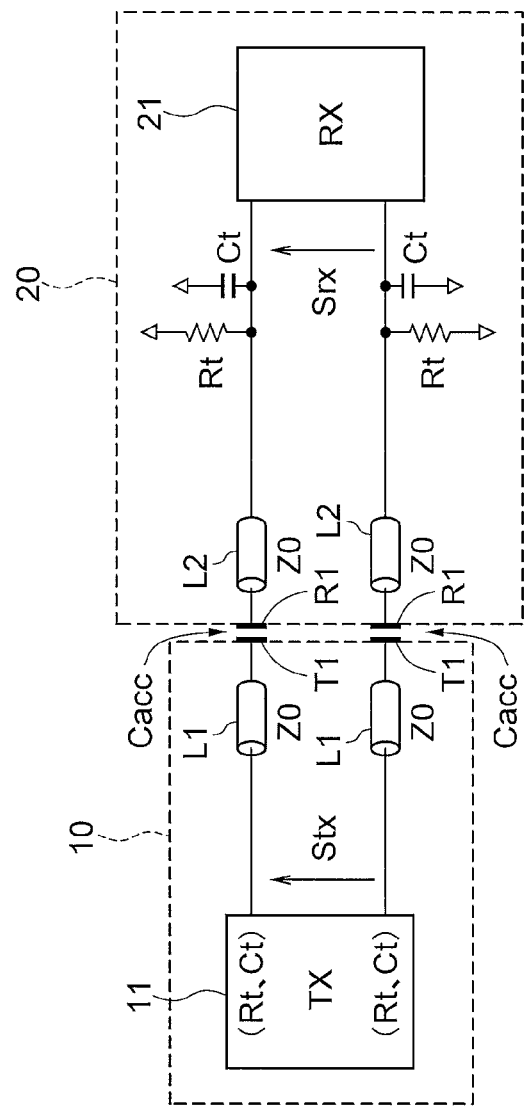
FIG. 1 is a block diagram illustrating a schematic structure of a communication system according to a first embodiment.

FIG. 1 is a block diagram illustrating a schematic structure of a communication system 1 according to a first embodiment. As illustrated in FIG. 1, the communication system 1 includes a first communication device (a transmitter) 10 and a second communication device (a receiver) 20. The first communication device 10 and the second communication device 20 perform contactless communication using capacitive coupling (AC coupling: Alternating Current coupling). In this embodiment, capacitive coupling is used as AC coupling.

The first communication device 10 includes a pair of transmitting electrodes (transmitting AC coupling element) T1, a pair of first transmission lines L1, and a transmission circuit 11. The transmitting electrodes T1, the first transmission lines L1 and the transmission circuit 11 are provided on a printed circuit board of the first communication device 10, for example.

The transmitting electrodes T1 are, for example, thin-film shaped metal patterns in any shape in a planar view such as a circular shape, an oval shape, or a triangular shape.

The first transmission lines L1 are, for example, microstrip lines or the like and respectively have one end connected to the transmitting electrode T1.

The transmission circuit 11 is connected to an other end of the respective first transmission lines L1 and outputs a differential transmission signal Stx corresponding to transmission data. Thus, this transmission signal Stx is transmitted from the transmitting electrodes T1 via the first transmission lines L1. In the following, an example where a differential signal is used will be explained; however, a single-ended signal may also be used, as an example.

Each output terminal of the transmission circuit 11 has an output impedance Rt and a parasitic capacitance Ct.

The second communication device 20 includes a pair of receiving electrodes (receiving AC coupling element) R1, a pair of second transmission lines L2 and a reception circuit 21. The receiving electrodes R1, the second transmission lines L2 and the reception circuit 21 are provided on a printed circuit board of the second communication device 20, for example.

The receiving electrodes R1 are metal patterns in the same shape as the transmitting electrodes T1.

When performing communication, the first communication device 10 and the second communication device 20 are placed closed to each other so that the transmitting electrodes T1 and the receiving electrodes R1 become close to each other. The distance between the transmitting electrodes T1 and the receiving electrodes R1 is, for example, several millimeters. With such an arrangement, the receiving electrodes R1 are capacitively coupled to the transmitting electrodes T1 and a coupling capacitance Cacc becomes some hundreds fF to some pF, for example. In other word, the receiving electrodes R1 are coupled to the transmitting electrodes T1 using AC coupling. With this, a signal is transmitted from the transmitting electrodes T1 to the receiving electrodes R1 via the coupling capacitance Cacc.

The second transmission lines L2 are microstrip lines or the like for example and respectively have one end connected to the receiving electrode R1.

The reception circuit 21 is connected to an other end of the respective second transmission lines L2 and receives a differential reception signal Srx corresponding to the transmission signal Stx transmitted via the receiving electrodes R1 and the second transmission lines L2. The reception circuit 21 has an unillustrated hysteresis circuit (hysteresis buffer). The hysteresis circuit has a hysteresis in input and output characteristics and outputs output data according to the reception signal Srx.

Between each input terminals of the reception circuit 21 and a ground, a termination resistance Rt is connected. Further, a parasitic capacitance Ct exists parallel to the termination resistance Rt. The following explanation will be made base on an assumption that, in the present embodiment, the termination resistance Rt is equivalent to the output impedance Rt of the transmission circuit 11 and the parasitic capacitance Ct in the side of reception circuit 21 is equivalent to the parasitic capacitance Ct in the output terminal of the transmission circuit 11. In actual, these values differ in the side of reception circuit 21 and in the side of transmission circuit 11 but the following explanations and equations are effective when the difference in the values is adequately small. The termination resistance Rt and the output impedance Rt in the transmission circuit 11 are not specified in particular but can be 40Ω or more and 60Ω or less, for example.

The transmission signal Stx is an almost square wave and changes between a negative voltage and a positive voltage according to the transmission data. The transmission signal Stx represents data "0" in a case of a negative voltage, and data "1" in a case of a positive voltage, for example.

Mainly due to the coupling capacitance Cacc, the reception signal Srx changes from zero volt to positive voltage at a timing when the transmission signal Stx changes from a negative voltage to a positive voltage and then gradually returns to zero volt. Further, the reception signal Srx changes from zero volt to a negative voltage at a timing when the transmission signal Stx changes from a positive voltage to a negative voltage and then gradually returns to zero volt after that.

In the present embodiment, characteristic impedances Z0 of the first transmission line L1 and the second transmission line L2 are greater than the output impedance Rt of the transmission circuit 11 and the termination resistance Rt. With this, the signal quality of the reception signal Srx can be efficiently improved as described below.

The reason why the characteristic impedance Z0 is set in this manner will be explained in detail.

The inventors of the present invention independently acquired that, in communication by the communication system 1 using a capacitive coupling, the signal quality of the reception signal Srx is deteriorated due to factors (1) to (3).

(1) An intersymbol interference occurs due to a high pass characteristic by capacitive coupling.

(2) Reflection of a signal occurs due to an impedance discontinuity in a coupling capacitance Cacc.

(3) Reflection of a signal occurs due to an impedance discontinuity between the transmission circuit 11 and the first transmission lines L1 and an impedance discontinuity between the second transmission lines L2 and the reception circuit 21.

The intersymbol interference caused by the factor (1) and the reflected signal by the reflection caused by the factors (2) and (3) deteriorate a signal to noise ratio (S/N ratio) of the reception signal Srx since the intersymbol interference and the reflected signal are input to the reception circuit 21 as noise. When the magnitude of the S/N ratio deterioration is large, there may be a high possibility that the reception circuit 21 cannot accurately restore the transmitted original data pattern.

In other words, this type of problem occurs in a communication system of a comparative example in which the characteristic impedances Z0 of the first transmission lines L1 and the second transmission lines L2 are not set as those in the present embodiment.

Figure 2A:
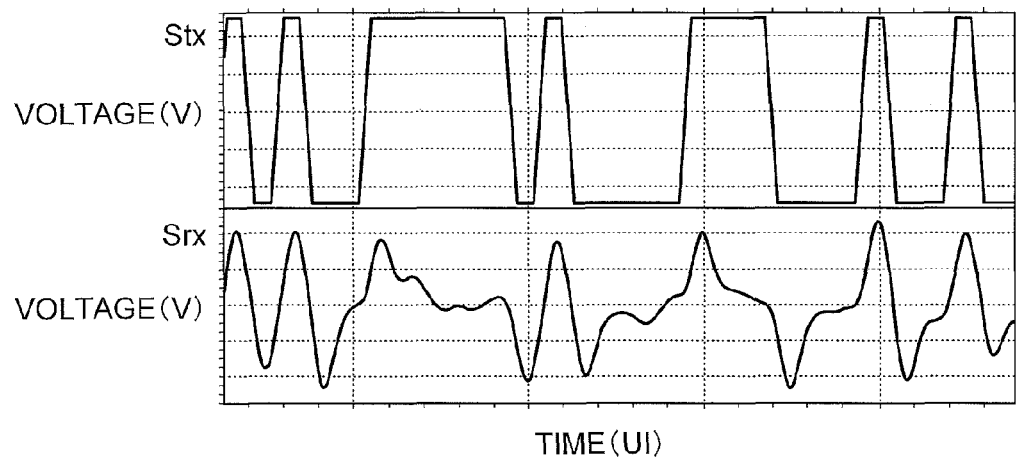
FIG. 2A is a waveform diagram illustrating a transmission signal and a reception signal of a communication system of a comparative example.
Figure 2B:
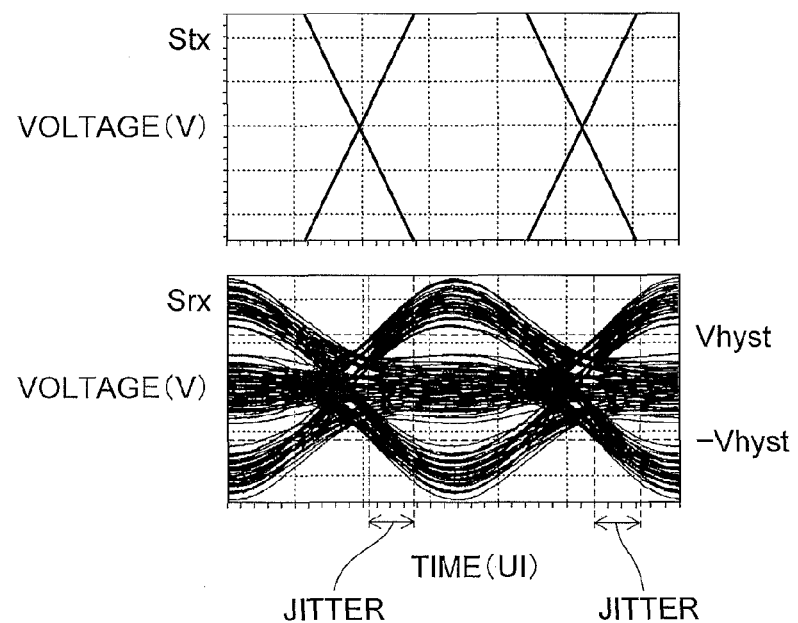
FIG. 2B is a diagram illustrating eye patterns of the transmission signal and the reception signal in FIG. 2A.

FIG. 2A is a waveform diagram illustrating a transmission signal Stx and a reception signal Srx of a communication system of a comparative example. FIG. 2B is a diagram illustrating eye patterns of the transmission signal Stx and the reception signal Srx in FIG. 2A. As illustrated in FIGS. 2A and 2B, as a consequence of the factors (1) to (3), relatively large intersymbol interference and reflected signal are included in the reception signal Srx and, as a result, jitter of the reception signal Srx in the eye pattern is relatively large. In other words, the S/N ratio of the reception signal Srx is deteriorated. Here, in this specification, as illustrated in FIG. 2B, jitter in the eye pattern represents variation in a time axis direction at a timing when the reception signal Srx becomes a threshold voltage Vhyst or more or a threshold voltage (−Vhyst) or less of the hysteresis circuit.

Thus, firstly, the inventors of the present invention quantitatively analyzed the influence of the respective factors (1) to (3) on the S/N ratio of the reception signal Srx.

Regarding Factor (1)

Figure 3A:
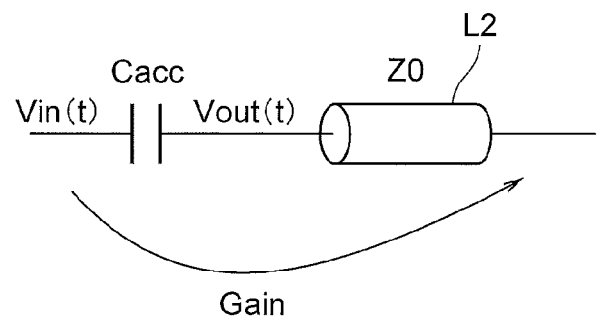
FIG. 3A is a circuit diagram for calculating an intersymbol interference.
Figure 3B:
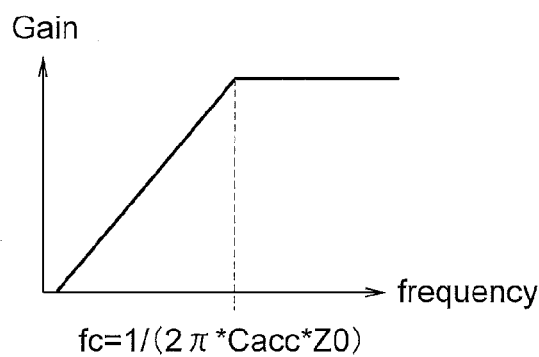
FIG. 3B is a diagram schematically illustrating a frequency characteristic of the circuit of FIG. 3A.
Figure 3C:
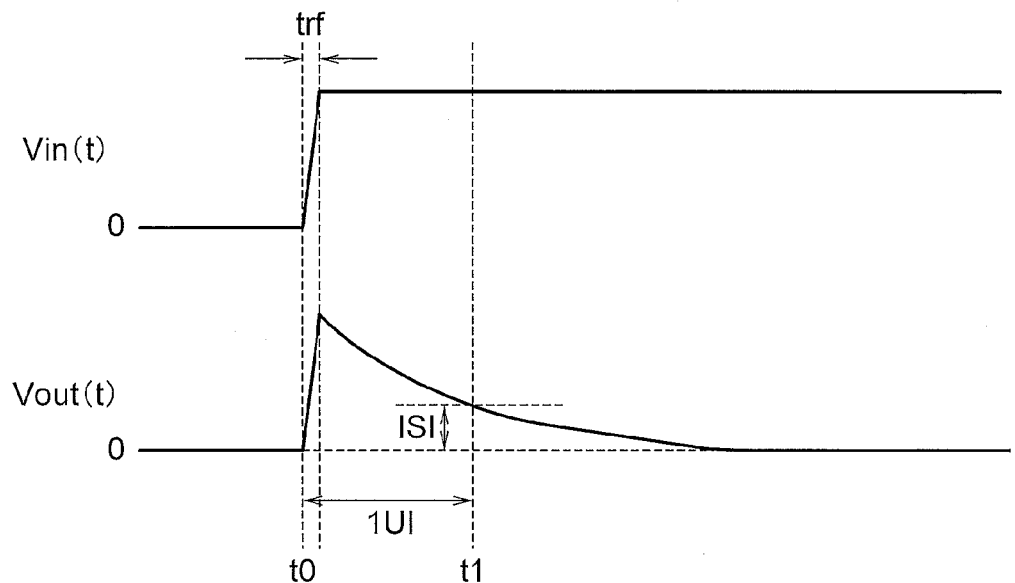
FIG. 3C is a waveform diagram schematically illustrating an input signal to a coupling capacitance of FIG. 3A and an output signal from the coupling capacitance.

FIG. 3A is a circuit diagram for calculating the intersymbol interference, FIG. 3B is a diagram schematically illustrating a frequency characteristic of the circuit of FIG. 3A, and FIG. 3C is a waveform diagram schematically illustrating an input signal to the coupling capacitance Cacc of FIG. 3A and an output signal from the coupling capacitance Cacc.

As illustrated in FIG. 3A, since the coupling capacitance Cacc and the second transmission lines L2 having the characteristic impedance Z0 are connected in series, they constitute a high pass filter. Thus, gain-frequency characteristic from the input in the coupling capacitance Cacc to the output in the second transmission lines L2 represents a high pass characteristic illustrated in FIG. 3B. The Cutoff frequency fc becomes $1/(2\pi C_{acc}Z_0)$.

As illustrated in FIG. 3C, when an input signal Vin(t) which rises at time t0 in a step-like shape is input to the coupling capacitance Cacc, an output signal Vout(t) from the coupling capacitance Cacc gradually reduces after rising at time t0. The output signal Vout(t) can be expressed by the following equation (1).

$$v_{out}(t) = CR\left\{u(t) - u(t-trf) - e^{-\frac{t}{CR}} + e^{-\frac{t-trf}{CR}}\right\} \quad (1)$$

Here, "u(t)" represents a unit step function and "t" represents time. "trf" represents a rise time or a fall time of the input signal Vin(t) in a step-like shape. The following explanations will be made with an assumption that the rise time and the fall time are equal. Even when these values differ, the following explanations and equations are effective when the difference between the values is adequately small.

Since the magnitude of the output signal Vout(t) at time t1, which is when 1 UI (unit interval) passes from time t0, becomes an intersymbol interference, the intersymbol interference ISI can be expressed by equation (2).

$$ISI = e^{-\frac{1}{C_{acc} \times Z_0 \times (datarate + 1/trf)}} - e^{-\frac{1}{C_{acc} \times Z_0 \times (datarate)}} \quad (2)$$

Here, "datarate" represents a data rate.

Based on the equation (2), it is found that, as the characteristic impedance Z0 is reduced, the cutoff frequency fc increases and an amplitude of the output signal Vout(t) at time t1 becomes small. This is also seen from that, when the cutoff frequency fc increases, a low-frequency component is further attenuated, the rise of the output signal Vout(t) becomes faster. Thus, in view of reducing the ISI, it is preferable that the characteristic impedance Z0 is low.

Regarding Factor (2)

Figure 4:
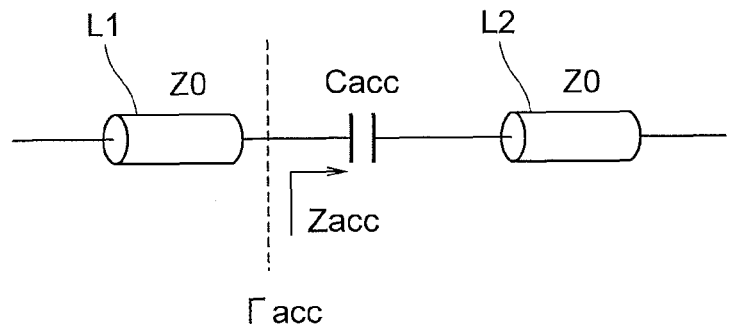
FIG. 4 is a circuit diagram for calculating a return loss in the coupling capacitance.

FIG. 4 is a circuit diagram for calculating a return loss in the coupling capacitance Cacc. In FIG. 4, an impedance is referred to as Zacc, which is seen from a connection node between the first transmission line L1 and the coupling capacitance Cacc toward the direction of the coupling capacitance Cacc and the second transmission line L2. Further, a reflection coefficient at the connection node between the first transmission line L1 and the coupling capacitance Cacc is referred to as Γacc.

The impedance Zacc can be expressed by the following equation (3).

$$Z_{acc} = Z_0 + \frac{1}{sC_{acc}} \quad (3)$$

Using the equation (3), the reflection coefficient Γacc can be expressed by the following equation (4).

$$\Gamma_{acc} = \frac{Z_{acc} - Z_0}{Z_{acc} + Z_0} \quad (4)$$

$$= \frac{1}{1 + s \cdot 2Z_0 C_{acc}}$$

Based on the equation (4), it is found that, as the characteristic impedance Z0 increases, the reflection coefficient Γacc reduces and the return loss is improved. Thus, in view of reducing the reflection, it is preferable that the characteristic impedance Z0 is high.

Here, in a well-known radio communication system or a wired communication system, a characteristic impedance of a transmission line is made to be equivalent to an output impedance of a transmission circuit and an input impedance of a reception circuit. This can reduce a return loss, and loss of signals can be reduced. The present embodiment is very different from the well-known radio communication system or the like at this point.

Regarding Factor (3)

Figure 5:
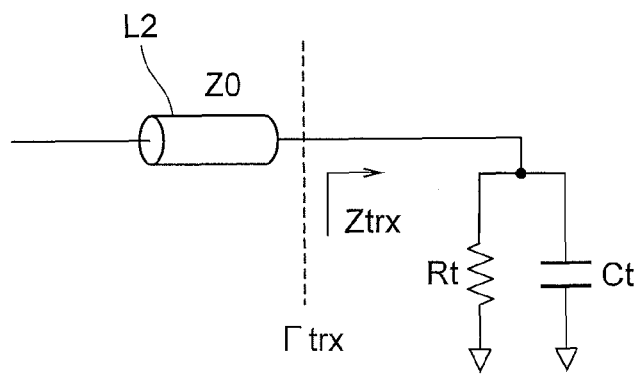
FIG. 5 is a circuit diagram for calculating a return loss between the second transmission lines and the reception circuit.

FIG. 5 is a circuit diagram for calculating a return loss between the second transmission lines L2 and the reception circuit 21. Since the input impedance of the reception circuit 21 is adequately high compared to the termination resistance Rt, the reception circuit 21 is not considered in the calculation. Further, the return loss between the first transmission line L1 and transmission circuit 11 can also be calculated in the circuit same as that in FIG. 5.

In FIG. 5, an impedance is referred to as Ztrx, which is seen from a connection node between the second transmission line L2 and the termination resistance Rt toward the direction of the termination resistance Rt. Further, a reflection coefficient at a connection node between the second transmission line L2 and the termination resistance Rt is referred to as Γtrx.

The impedance Ztrx can be expressed by the following equation (5).

$$Z_{trx} = \frac{R_t}{1 + sC_t R_t} = \frac{R_t(1 - j\omega C_t R_t)}{1 + (\omega C_t R_t)^2} \quad (5)$$

Using this equation (5), the reflection coefficient Γtrx can be expressed by the following equation (6).

$$\Gamma_{trx} = \frac{Z_{trx} - Z_0}{Z_{trx} + Z_0} \quad (6)$$

$$= \frac{R_t - Z_0}{R_t + Z_0} \cdot \frac{1 - s\frac{Z_0 R_t C_t}{R_t - Z_0}}{1 + s\frac{Z_0 R_t C_t}{R_t + Z_0}}$$

Based on the equation (6), it can be found that, as the characteristic impedance Z0 is reduced, the reflection coefficient Γtrx is reduced in a high frequency region and a return loss is improved. Thus, in view of reducing reflection in the high frequency region, it is preferable that the characteristic impedance Z0 is low.

With these calculations, the inventors of the present invention found that the preferable characteristic impedance Z0 can be different values corresponding to the coupling capacitance Cacc, the data rate datarate, the output impedance Rt, and the like.

Based on those findings, the inventors of the present invention specifically obtained the most appropriate characteristic impedance Z0 as explained below.

Figure 6:
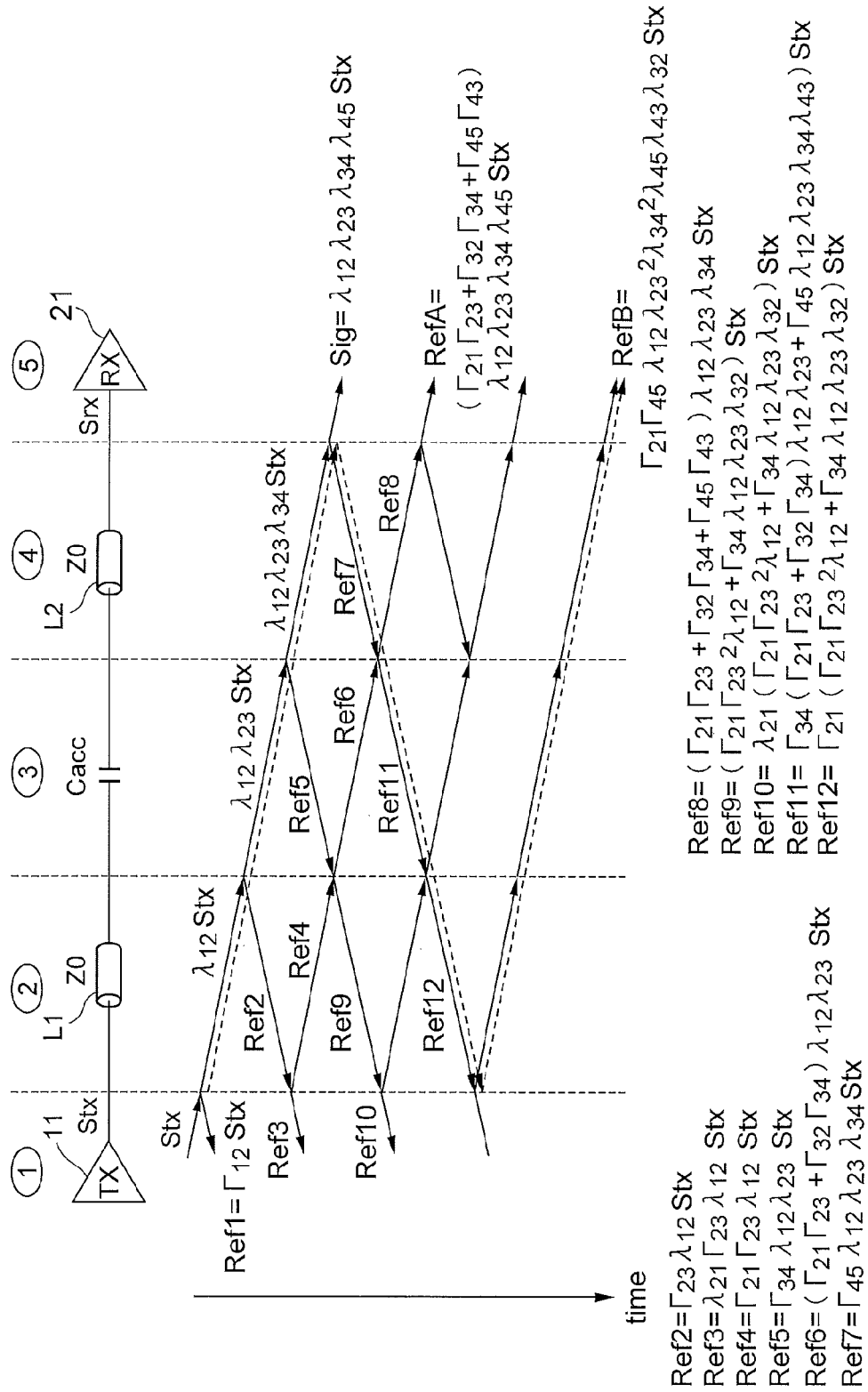
FIG. 6 is a diagram explaining a signal propagation of the communication system.

FIG. 6 is a diagram explaining a signal propagation of the communication system 1. In order to make explanation clear, the transmission circuit 11 is illustrated as a block 1, the first transmission line L1 is illustrated as a block 2, the coupling capacitance Cacc is illustrated as a block 3, the second transmission line L2 is illustrated as a block 4, and the reception circuit 21 is illustrated as a block 5. The arrows illustrated in FIG. 6 indicate a manner that the transmission signal Stx is propagated from the block 1 to the block 5 as the time passes.

"λxy" represents a transmission coefficient from a block x to a block y. "Γxy" represents a reflection coefficient from a block x to a block y (a reflection coefficient seen from the block x toward the block y). "x" and "y" are integral numbers from 1 to 5 respectively.

A transmitted signal Sig is a signal which is the transmission signal Stx transmitted through the blocks 2 to 4 and reached to the reception circuit 21 without being reflected. The transmitted signal Sig can be expressed as follows:

$$\text{Sig} = \lambda_{12}\lambda_{23}\lambda_{34}\lambda_{45}\text{Stx}$$

When it is assumed that the intersymbol interference and the reflected signal do not exist, the reception signal Srx is equivalent to the transmitted signal Sig; however, in actual, the reception signal Srx is the sum of the transmitted signal Sig, the intersymbol interference, and the reflected signal.

The reflected signal RefA is a reflected signal which primarily reaches to an input of the reception circuit 21 after the transmitted signal Sig reaches to the input of the reception circuit 21, and reflected signals Ref2, Ref4, Ref5, Ref6, Ref7 and Ref8 are considered. Thus, the reflected signal RefA can be expressed as follows:

$$\text{RefA} = (\Gamma_{21}\Gamma_{23} + \Gamma_{32}\Gamma_{34} + \Gamma_{45}\Gamma_{43})\lambda_{12}\lambda_{23}\lambda_{34}\lambda_{45}\text{Stx}$$

The reflected signal RefB is a reflected signal, which is a signal reflected between the block 4 and the block 5, further reflected between the block 2 and the block 1 and then reached to the block 5 again, considering reflections which can be primal. This path is illustrated with dashed arrows in FIG. 6. The reflected signal RefB reaches to the input of the reception circuit 21 later than the reflected signal RefA. The reflected signal RefB can be expressed as follows:

$$\text{RefB} = \Gamma_{21}\Gamma_{45}\lambda_{12}\lambda_{23}^2\lambda_{34}^2\lambda_{45}\lambda_{43}\lambda_{32}\text{Stx}$$

Since there are multiple reflections in addition to what is illustrated in FIG. 6, it is not realistic to consider all reflected signals. Further, reflected signals which are reflected more than once are weakened. Thus, in the following calculation, the above two reflected signals RefA and RefB, which are supposed to be the strongest, will be considered.

Next, the magnitudes of the transmitted signal Sig and the reflected signals RefA and RefB will be calculated.

The respective transmission coefficients $\lambda_{12}$, $\lambda_{23}$, $\lambda_{34}$ and $\lambda_{45}$ can be expressed by the following equations (7) to (10).

$$\lambda_{12} = \frac{2Z_0}{Z_0 + Z_{trx}} = \frac{2Z_0}{R_t + Z_0} \cdot \frac{1 + sC_tR_t}{1 + s\frac{R_tZ_0}{R_t + Z_0}C_t} \quad (7)$$

$$\lambda_{23} = \frac{2Z_{acc}}{Z_{acc} + Z_0} = \frac{2(1 + sZ_0C_{acc})}{1 + s \cdot Z_0C_{acc}} \quad (= \lambda_{43}) \quad (8)$$

$$\lambda_{34} = \frac{2Z_0}{Z_0 + Z_{acc}} = \frac{s \cdot 2Z_0C_{acc}}{1 + s \cdot 2Z_0C_{acc}} \quad (= \lambda_{32}) \quad (9)$$

$$\lambda_{45} = \frac{2Z_{trx}}{Z_{trx} + Z_0} = \frac{2R_t}{R_t + Z_0} \cdot \frac{1}{1 + s\frac{R_tZ_0}{R_t + Z_0}C_t} \quad (10)$$

Accordingly, the following equation (11) can be obtained.

$$\lambda_{12}\lambda_{23}\lambda_{34}\lambda_{45} = \frac{16Z_0^2 R_t C_{acc}}{(R_t + Z_0)^2} \cdot \frac{s(1 + sZ_0C_{acc})\cdot(1 + sC_tR_t)}{(1 + s \cdot 2Z_0C_{acc})^2 \cdot \left(1 + s\frac{R_tZ_0}{R_t + Z_0}C_t\right)^2} \quad (11)$$

$$|\lambda_{12}\lambda_{23}\lambda_{34}\lambda_{45}| =$$

$$\frac{16Z_0^2 R_t C_{acc}}{(R_t + Z_0)^2} \cdot \frac{\omega\sqrt{(1 + (\omega Z_0 C_{acc})^2)\cdot(1 + (\omega R_t C_t)^2)}}{(1 + (2\omega Z_0 C_{acc})^2)\cdot\left(1 + \left(\omega\frac{R_tZ_0}{R_t + Z_0}C_t\right)^2\right)}$$

The transmitted signal Sig is a product of the right side of the equation (11) and the transmission signal Stx.

Further, the respective reflection coefficients $\Gamma_{21}$, $\Gamma_{23}$, $\Gamma_{32}$, $\Gamma_{34}$, $\Gamma_{45}$ and $\Gamma_{43}$ can be expressed by the following equations (12) and (13).

$$\Gamma_{45} = \Gamma_{21}, \Gamma_{43} = \Gamma_{23}, \Gamma_{34} = \Gamma_{32} = -\Gamma_{23} \quad (12)$$

$$\Gamma_{21} = \frac{Z_0 - Z_{trx}}{Z_0 + Z_{trx}}, \quad \Gamma_{23} = \frac{Z_0 - Z_{acc}}{Z_0 + Z_{acc}} \quad (13)$$

Accordingly, the following equation (14) is obtained.

$$(\Gamma_{21}\Gamma_{23} + \Gamma_{32}\Gamma_{34} + \Gamma_{45}\Gamma_{43}) = \quad (14)$$

$$\Gamma_{23}(2\Gamma_{21} + \Gamma_{23}) = -\frac{s^2 \cdot 4Z_0^2 R_t C_{acc} C_t + s(4Z_0^2 C_{acc} - 4C_{acc}Z_0 R_t + C_t R_t Z_0) + Z_0 - 3R_t}{(1 + s \cdot 2C_{acc}Z_0)^2 (R_t + Z_0 + sC_tR_tZ_0)}$$

$$|\Gamma_{21}\Gamma_{23} + \Gamma_{32}\Gamma_{34} + \Gamma_{45}\Gamma_{43}| =$$

$$\frac{\left(\sqrt{(Z_0 - 3R_t - 4\omega^2 Z_0^2 R_t C_{acc} C_t)^2 + \omega^2(4Z_0^2 C_{acc} - 4C_{acc}Z_0 R_t + C_t R_t Z_0)^2}\right)}{\left((1 + (2\omega C_{acc}Z_0)^2)\sqrt{((R_t + Z_0)^2 + (\omega C_t R_t Z_0)^2)}\right)}$$

The reflected signal RefA is a product of the right side of the equation (14) and the transmitted signal Sig.

The reflected signal RefB can also be obtained in the same manner; however, the descriptions of the detailed equation are omitted.

Next, an S/N ratio of the reception signal Srx will be calculated. The S/N ratio is a ratio of the transmitted signal Sig and noise. The noise is assumed to be a sum of the intersymbol interference ISI of the equation (2), the reflected signal RefA, and the reflected signal RefB. Thus, the S/N ratio is obtained as the following equation (15).

$$S/N \text{ ratio} = \text{Sig}/(\text{ISI} + \text{Ref}A + \text{Ref}B) \quad (15)$$

Here, it is assumed that the output impedance Rt and the termination resistance Rt are 50Ω and the parasitic capacitance Ct is 0.5 pF. The rise/fall time trf of the transmission signal Stx is assumed to be 80 ps. Accordingly, the frequency f is determined to be 3.5 GHz and an angular velocity ω is determined to be 22.0 Grad/s. The data rate datarate is assumed to be 6 Gbps. Accordingly, 1 UI is determined to be 166.7 ps.

Figure 7:
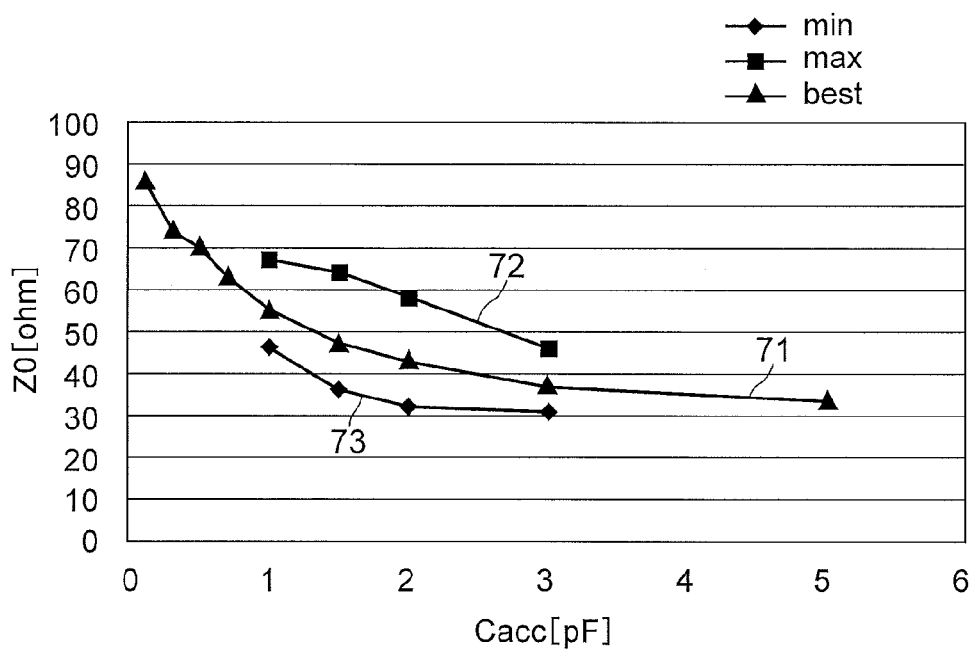
FIG. 7 is a diagram illustrating a relation between a characteristic impedance and the coupling capacitance, which maximize the S/N ratio.

It can be found that, when these values are assigned to the equation (15), the characteristic impedance Z0 and the coupling capacitance Cacc need to satisfy the relation illustrated in FIG. 7 in order to maximize the S/N ratio of the reception signal Srx.

FIG. 7 is a diagram illustrating a relation between the characteristic impedance Z0 and the coupling capacitance Cacc, which maximize the S/N ratio. With the combination of the characteristic impedance Z0 and the coupling capacitance Cacc of the relation line 71 in FIG. 7, the maximum S/N ratio can be obtained. Thus, in order to obtain the maximum S/N ratio, the characteristic impedance Z0 needs to be increased as the coupling capacitance Cacc reduces.

Further, in order to increase the S/N ratio higher than 1.8 times, the characteristic impedance Z0 and the coupling capacitance Cacc need to be set between a maximum value curve 72 and a minimum value curve 73. The maximum value curve 72 illustrates the relation between the maximum characteristic impedance Z0 and the coupling capacitance Cacc that can make the S/N ratio higher than 1.8 times. The minimum value curve 73 illustrates the relation between the minimum characteristic impedance Z0 and the coupling capacitance Cacc that can make the S/N ratio higher than 1.8 times. For example, when the coupling capacitance Cacc is 1 pF, the S/N ratio can be made higher than 1.8 times by setting the characteristic impedance Z0 to be about 46Ω or more and about 67Ω or less. The "1.8 times" is an example but, when the S/N ratio can be made higher than 1.8 times, designing the reception circuit 21 can be easier.

Particularly, when the coupling capacitance Cacc is 1 pF or less, the S/N ratio can be improved when the characteristic impedance Z0 is more than the output impedance Rt and the termination resistance Rt (=50Ω) and 90Ω or less. This is because the factor (2) is dominant compared to the factors (1) and (3) in this range in which the coupling capacitance Cacc is small.

When the data rate datarate, the rise/fall time trf, the output impedance Rt or the like vary, the relation line 71 of FIG. 7 changes to a certain degree. As described above, even with a condition different from the above explanation, for example, when the coupling capacitance Cacc is 10 pF or less, the S/N ratio can be improved if the characteristic impedance Z0 is more than the output impedance Rt of the transmission circuit 11.

As described above, according to the present embodiment, since the characteristic impedance Z0 is more than the output impedance Rt of the transmission circuit 11 and the termination resistance Rt, the return loss at the coupling capacitance Cacc can be reduced even when the coupling capacitance Cacc is 1 pF or less and the impedance is high. With this, since the reflection of the signal at the coupling capacitance Cacc can be reduced, the amplitude of the reflected signals RefA and RefB overlapped with the transmitted signal Sig can be reduced. Thus, since noise can be reduced, the S/N ratio of the reception signal Srx can be reduced. In other words, the signal quality of the reception signal Srx can be improved.

Second Embodiment

One of characteristics of a second embodiment is that a delay time Td1 of the first transmission line L1 and a delay time Td2 of the second transmission line L2 are set to preferable values.

Figure 8:
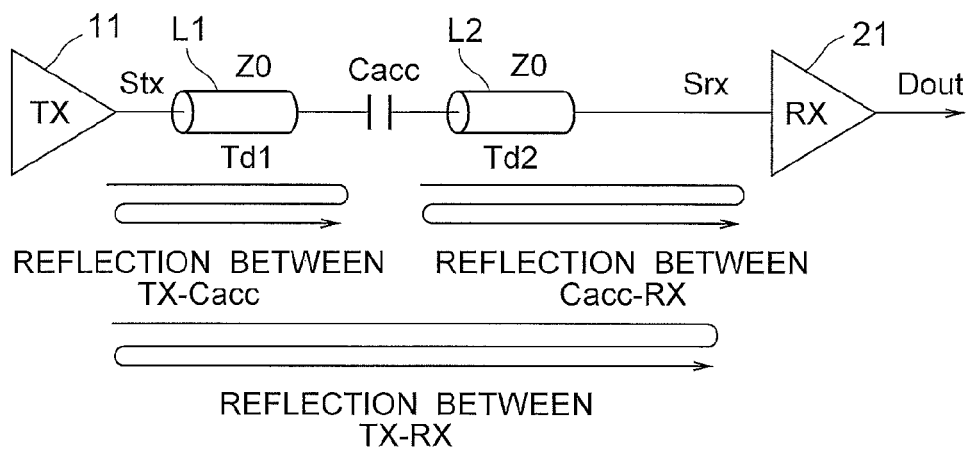
FIG. 8 is a block diagram illustrating a schematic structure of a communication system according to a second embodiment.

FIG. 8 is a block diagram illustrating a schematic structure of a communication system 1 according to the second embodiment. In FIG. 8, same numeral references are applied to the components which are in common with FIG. 1 and differences will be mainly explained.

In FIG. 8, to make the explanation clear, a single-ended structure is illustrated; however, a basic structure of the communication system 1 of the second embodiment is the same as that in the first embodiment. In other words, the structure of the differential illustrated in FIG. 1 may be employed. Further, similarly to the first embodiment, the characteristic impedance Z0 may be more than the output impedance Rt of the transmission circuit 11 and does not have to be set in this manner.

The reception circuit 21 includes a hysteresis circuit. The hysteresis circuit has a hysteresis in input and output characteristics, compares the reception signal Srx with a first threshold voltage Vhyst and a second negative threshold voltage (−Vhyst) which is lower than the first threshold voltage Vhyst, and outputs output data Dout according to the comparison result. Concretely, the hysteresis circuit outputs output data Dout in a high level ("1") when the reception signal Srx changes into the first threshold voltage Vhyst or more, and outputs output data Dout in a low level ("0") when the reception signal Srx changes into the second threshold voltage (−Vhyst) or less.

As described in the first embodiment, the reception signal Srx includes a transmitted signal which is the transmission signal Stx reached to the reception circuit 21 without being reflected and a reflected signal which is the transmission signal Stx reached to the reception circuit 21 after being reflected once or more.

In the present embodiment, regarding the input of the reception circuit 21, the delay time Td1 of the first transmission line L1 and the delay time Td2 of the second transmission line L2 are set so that the timing when the transmitted signal becomes the first threshold voltage Vhyst or more, or the second threshold voltage (−Vhyst) or less is different from the timing when an absolute value of the amplitude of the reflected signal becomes maximum. With this, the signal quality of the reception signal Srx can be efficiently improved as described below.

Hereinafter, the reason why the delay times Td1 and Td2 are set in this manner will be described in detail.

Figure 9:
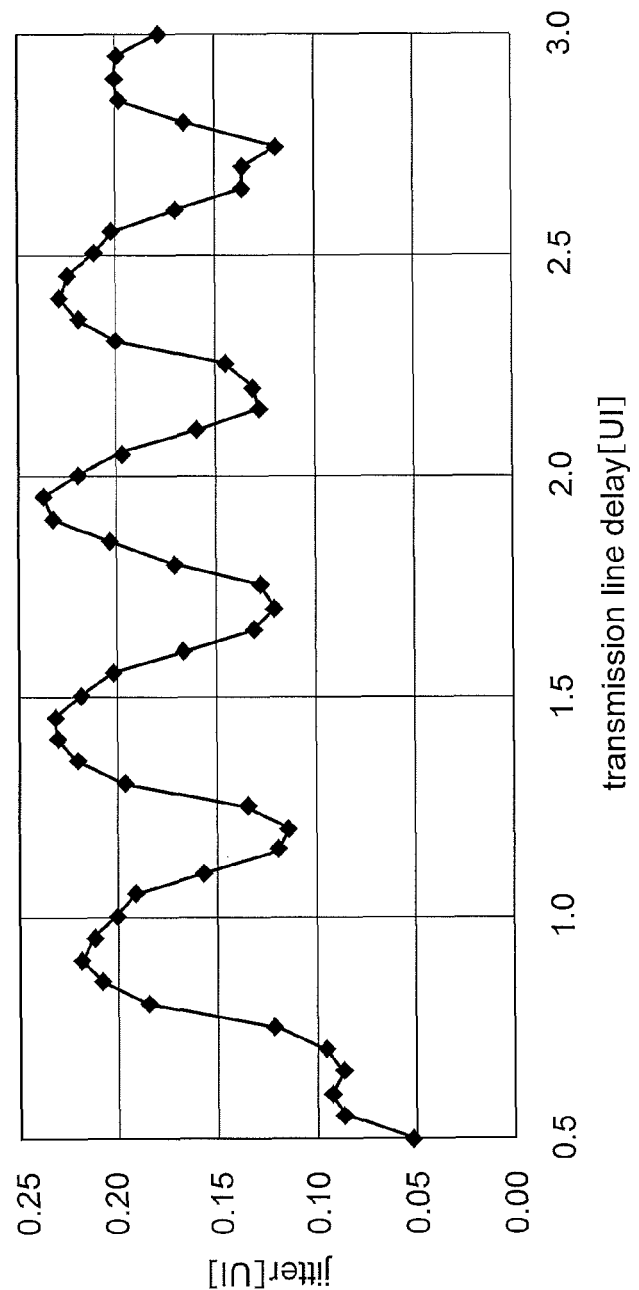
FIG. 9 is a diagram illustrating a relation between the jitter of the output data and the delay times of the first and second transmission lines.

FIG. 9 is a diagram illustrating a relation between the jitter of the output data Dout and the delay times Td1 and Td2 of the first and second transmission lines L1 and L2. As illustrated in FIG. 9, the inventors of the present invention independently found that the jitter of the output data Dout varies when the delay times Td1 and Td2 change. In other words, the jitter of the output data Dout may become the minimum value or the maximum value according to the delay time Td1 or Td2. The inventors of the present invention have created the present invention based on their own findings.

Figure 10A:
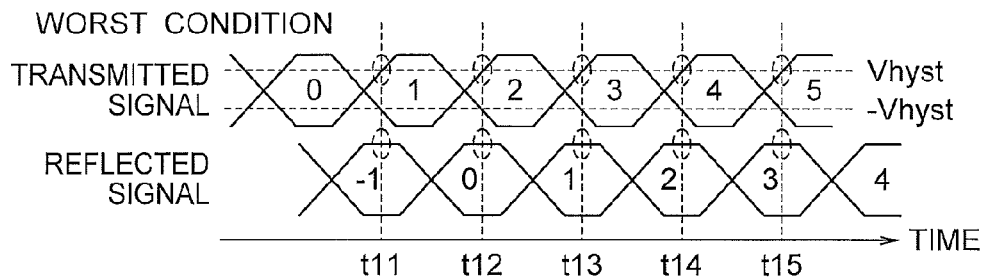
FIG. 10A is a waveform diagram schematically illustrating the transmitted signal and the reflected signal in the input of the reception circuit in a worst condition.

FIG. 10A is a waveform diagram schematically illustrating the transmitted signal and the reflected signal in the input of the reception circuit 21 in a worst condition. As illustrated in FIG. 10A, the absolute value of the amplitude of the reflected signal becomes the maximum at respective the timings t11, t12, t13, t14 and t15 when the transmitted signal becomes the first threshold voltage Vhyst or more, or the second threshold voltage (−Vhyst) or less.

Here, the numbers −1 to 5 applied in FIG. 10A represent that, for example, a waveform with the number 0 of the transmitted signal is delayed due to reflection and becomes a waveform of a reflected signal with the same number 0.

Figure 10B:
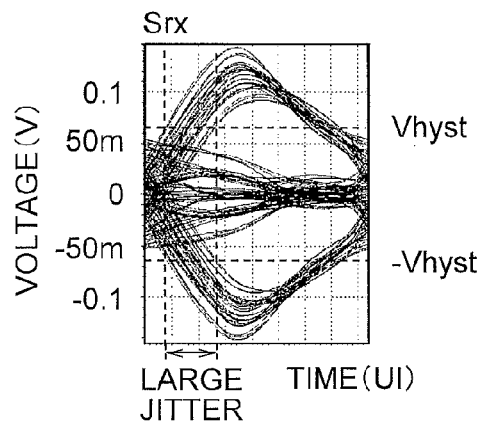
FIG. 10B is a diagram illustrating an eye pattern of the reception signal in the worst condition.

As illustrated in FIG. 10B, an eye pattern of the reception signal Srx in which a transmitted signal and a reflected signal are overlapped has a relatively large jitter at a timing when the reception signal Srx becomes the first threshold voltage Vhyst or more, or the second threshold voltage (−Vhyst) or less. This is because that, since the delay time of the reflected signal varies corresponding to the delay time of the transmission line, the absolute value of the amplitude of the reflected signal is large at this timing and this causes that the reflected signal increases the jitter of the reception signal Srx. Accordingly, the jitter of the output data Dout also becomes large.

Figure 10C:
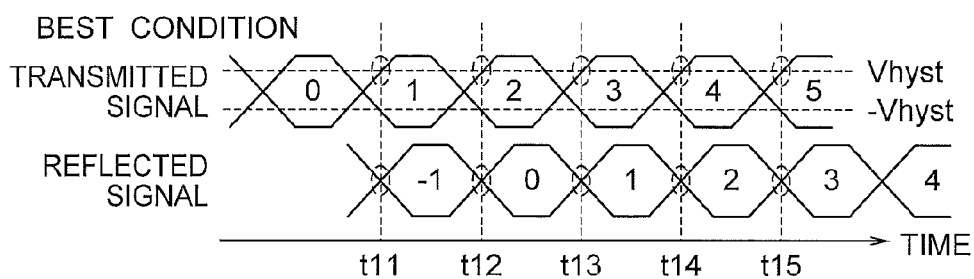
FIG. 10C is a waveform diagram schematically illustrating the transmitted signal and the reflected signal in the input of the reception circuit in a best condition.

FIG. 10C is a waveform diagram schematically illustrating the transmitted signal and the reflected signal in the input of the reception circuit 21 in a best condition. As illustrated in FIG. 10C, the absolute value of the amplitude of the reflected signal becomes minimum at respective timings t11, t12, t13, t14 and t15 when the transmitted signal becomes the first threshold voltage Vhyst or more, or the second threshold voltage (−Vhyst) or less.

Figure 10D:
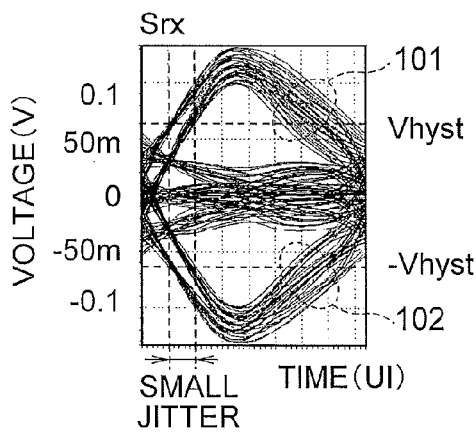
FIG. 10D is a diagram illustrating the eye pattern of the reception signal in the best condition.

With this, as illustrated in FIG. 10D, the eye pattern of the reception signal Srx in the input of the reception circuit 21 has less jitter than the case of FIG. 10B at timings when the reception signal Srx becomes the first threshold voltage Vhyst or more, or the second threshold voltage (−Vhyst) or less. This is because, at this timing, the absolute value of the amplitude of the reflected signal is minimum and the influence of the reflected signal given to the reception signal Srx is also small. Thus, the jitter of the output data Dout becomes smaller than the cases of FIGS. 10A and 10B.

Here, in the case of FIG. 10D, in a region 101 where the reception signal Srx rises and then falls and a region 102 where the reception signal Srx falls and then rises, the variation of the eye pattern in the time axis direction is greater than the case of FIG. 10B. However, since the output data Dout does not vary at this timing due to the characteristic of the hysteresis circuit, the jitter of the output data Dout is not affected.

Next, a method for setting such a best condition will be explained.

Figure 11:
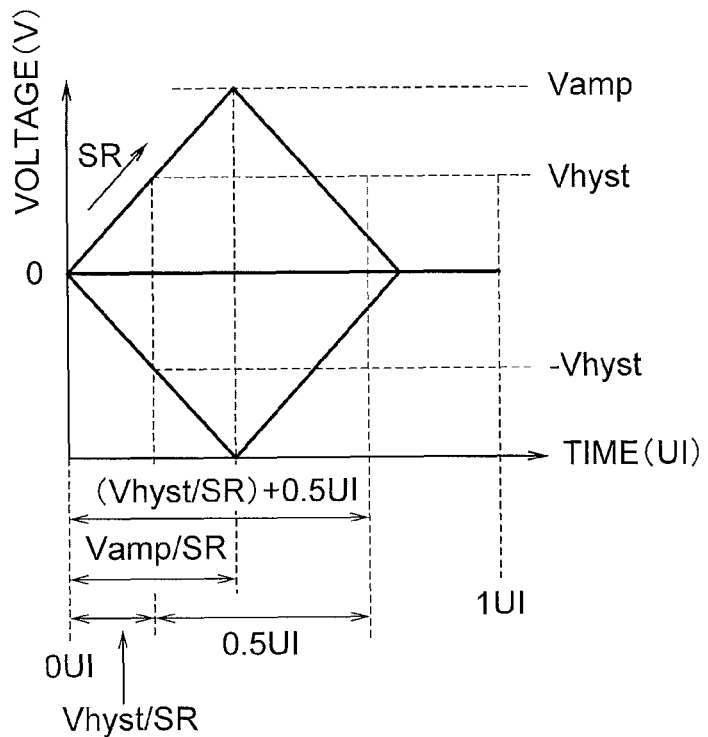
FIG. 11 is a diagram schematically illustrating the eye pattern of a transmitted signal in the input of the reception circuit.

FIG. 11 is a diagram schematically illustrating the eye pattern of a transmitted signal in the input of the reception circuit 21.

Here, a slew rate of the transmitted signal is set as SR[V/s] and a unit interval of the transmission signal Stx is set as UI[s].

When the timing the transmitted signal varies is assumed to be 0 UI, it is required to keep the absolute value of the amplitude of the reflected signal not to be maximum at the timing of "0 UI+Vhyst/SR[s]" as described above. Thus, the best condition is that the absolute value of the amplitude of the reflected signal becomes maximum about a timing in the middle between a timing of "0 UI+Vhyst/SR[s]" and a timing of "Vhyst/SR+1 UI[s]" when the transmitted signal subsequently becomes the first threshold voltage Vhyst or more, or the second threshold voltage (−Vhyst) or less. In other words, it is preferable that the absolute value of the amplitude of the reflected signal becomes maximum about a timing of "(Vhyst/SR)+0.5 UI[s]."

Here, as illustrated in FIG. 8, a reflection between the transmission circuit 11 and the coupling capacitance Cacc, the reflection between the coupling capacitance Cacc and the reception circuit 21, and the reflection between the transmission circuit 11 and reception circuit 21 will be considered. A reflected wave caused by the reflection between the transmission circuit 11 and the coupling capacitance Cacc is delayed by "2×Td1" compared to a transmitted wave. A reflected wave caused by the reflection between the coupling capacitance Cacc and the reception circuit 21 delays by "2×Td2" compared to a transmitted wave. A reflected wave caused by the reflection between the transmission circuit 11 and the reception circuit 21 delays by "2(Td1+Td2)" compared to a transmitted wave.

Based on the above, while the absolute value of the amplitude of the transmitted signal is set as Vamp[V], and N_UI is set as an integer multiple of UI, the integer being zero or more, the delay time Td1 and the delay time Td2 are preferably set so that at least one of "2×Td1," "2×Td2," and "2(Td1+Td2)" is almost equivalent to "N_UI+Vhyst/SR+0.5 UI−Vamp/SR." This causes the above described best condition and the jitter can be minimized. The jitter can be further reduced when more of "2×Td1," "2×Td2," and "2(Td1+Td2)" satisfy the above condition.

Figure 12:
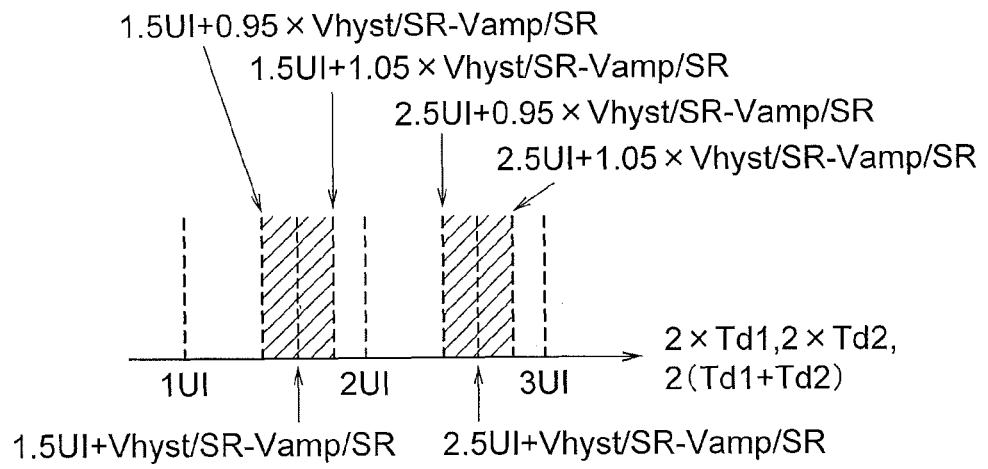
FIG. 12 is a diagram illustrating a range of preferable delay times.

FIG. 12 is a diagram illustrating a range of preferable delay times Td1 and Td2. For example, jitter can be efficiently reduced when at least one of "2×Td1," "2×Td2," and "2(Td1+Td2)" is in a range from "N_UI+0.95×Vhyst/SR+0.5 UI−Vamp/SR" to "N_UI+1.05×Vhyst/SR+0.5 UI−Vamp/SR." The range may be wider; however, the reduction effect of jitter is reduced as "2×Td1" or the like becomes more different from "N_UI+Vhyst/SR+0.5 UI−Vamp/SR." In other words, as long as the delay time Td1 and the delay time Td2 are set so that one of "2×Td1," "2×Td2," and "2(Td1+Td2)" is different from "N_UI+Vhyst/SR−Vamp/SR," jitter can be reduced compared to the worst condition.

As described above, according to the present embodiment, the absolute value of the amplitude of the reflected signal is kept not to be maximized at the timing when the transmitted signal becomes the first threshold voltage Vhyst or more, or the second threshold voltage (−Vhyst) or less, that is, at the timing when the output data Dout from the reception circuit 21 varies. With this, since the jitter of the reception signal Srx can be reduced at this timing, the signal quality of the reception signal Srx can be improved.

As a result, even when there is a reflected signal, the jitter of the output data Dout can be reduced.

Further, similarly to the first embodiment, the signal quality of the reception signal Srx can be further improved since the S/N ratio of the reception signal Srx can be improved by setting the characteristic impedance Z0 greater than the output impedance Rt of the transmission circuit 11.

Third Embodiment

The second embodiment may be applied to a communication system using an inductive coupling as AC coupling. Hereinafter, differences from the second embodiment will be mainly explained.

Figure 13:
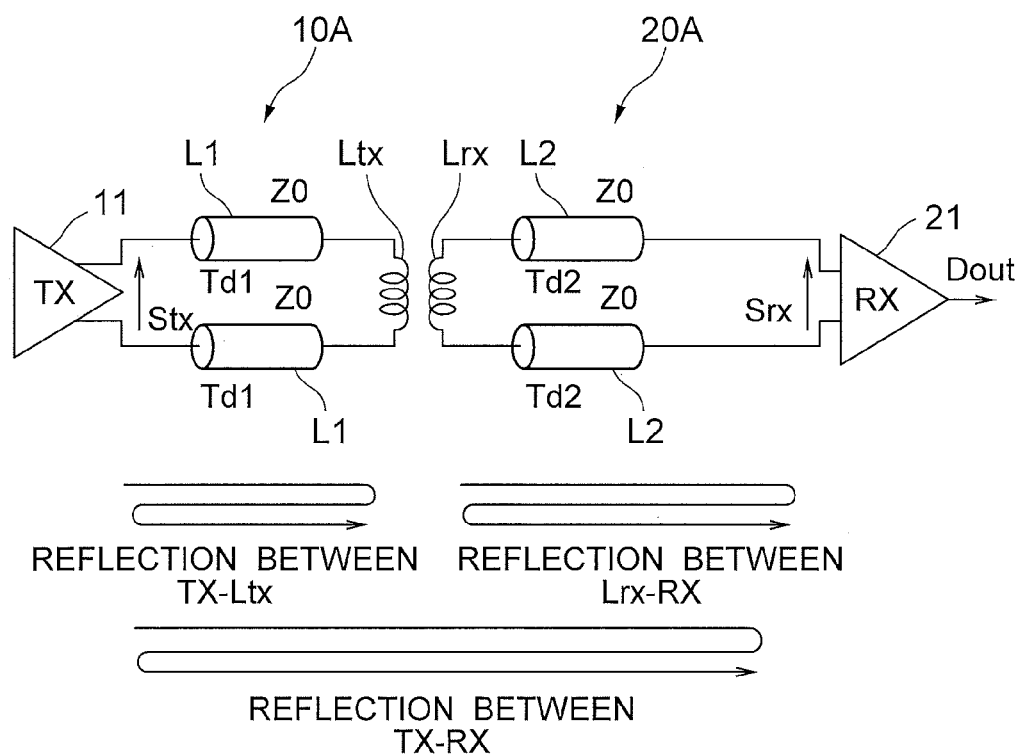
FIG. 13 is a block diagram illustrating a schematic structure of a communication system according to a third embodiment.

FIG. 13 is a block diagram illustrating a schematic structure of a communication system 1A according to a third embodiment. The communication system 1A has a difference from the second embodiment that a transmitting coil (transmitting AC coupling element) Ltx and a receiving coil (receiving AC coupling element) Lrx are included as substitute for the transmitting electrode T1 and the receiving electrode R1.

In other words, a pair of first transmissions lines L1 respectively has one end connected to the transmitting coil Ltx. Concretely, the transmitting coil Ltx is connected between one ends of the first transmission lines L1.

A pair of second transmission lines L2 respectively has one end connected to the receiving coil Lrx. Concretely, the receiving coil Lrx is connected between one ends of the second transmission lines L2.

When communication is executed, the receiving coil Lrx is inductively coupled to the transmitting coil Ltx. In other word, the receiving coil Lrx is coupled to the transmitting coil Ltx using AC coupling. With this, the reception circuit 21 receives a reception signal Srx via the receiving coil Lrx and the second transmission lines L2.

Here, two transmitting coils Ltx and two receiving coils Lrx may be provided, each of the transmitting coils Ltx may be connected between one end of the respective first transmission lines L1 and a ground, and each of the receiving coils Lrx may be connected between one end of the respective second transmission lines L2 and the ground. Further, a single-ended structure may also be employed.

In the present embodiment, similarly to the second embodiment, in the input reception circuit 21, the delay time Td1 of the first transmission line L1 and the delay time Td2 of the second transmission line L2 are also set so that the timing when the transmitted signal becomes the first threshold voltage Vhyst or more, or the second threshold voltage (−Vhyst) or less is different from the timing when the absolute value of the amplitude of the reflected signal becomes maximum.

Further, similarly to the second embodiment, a reflected wave caused by reflection between the transmission circuit 11 and the transmitting coil Ltx delays by "2×Td1" compared to a transmitted wave. A reflected wave caused by reflection between the receiving coil Lrx and the reception circuit 21 delays by "2×Td2" compared to a transmitted wave. A reflected wave caused by reflection between the transmission circuit 11 and the reception circuit 21 delays by "2(Td1+Td2)" compared to a transmitted wave. At least one of "2×Td1," "2×Td2" and "2(Td1+Td2)" satisfies the condition explained in the second embodiment.

Therefore, also in the communication system 1A using inductive coupling, similarly to the second embodiment, the signal quality of the reception signal Srx can be improved.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A communication system comprising:
a transmitting electrode;
a first transmission line comprising one end connected to the transmitting electrode;
a transmission circuit connected to an other end of the first transmission line and configured to transmit a transmission signal;
a receiving electrode capacitively coupled to the transmitting electrode;
a second transmission line comprising one end connected to the receiving electrode; and
a reception circuit connected to an other end of the second transmission line and configured to receive a reception signal via the receiving electrode and the second transmission line,
wherein characteristic impedances of the first transmission line and the second transmission line are greater than an output impedance of the transmission circuit.

2. The communication system according to claim 1, wherein a coupling capacitance between the transmitting electrode and the receiving electrode is 10 pF or less.

3. The communication system according to claim 1, wherein the output impedance of the transmission circuit is 40Ω or more and 60Ω or less.

4. The communication system according to claim 1, wherein the characteristic impedances of the first transmission line and the second transmission line are 90Ω or less.

5. The communication system according to claim 1, wherein
the reception circuit comprises a hysteresis circuit having a hysteresis in input and output characteristics, the hysteresis circuit configured to compare the reception signal with the first threshold voltage and a second threshold voltage, the second threshold voltage being lower than the first threshold voltage, and configured to output output data according to the comparison result,
the reception signal comprises a transmitted signal and a reflected signal, the transmitted signal being the transmission signal reached to the reception circuit without being reflected, the reflected signal being the transmission signal reached to the reception circuit after being reflected, and
a delay time Td1 of the first transmission line and a delay time Td2 of the second transmission line are set so that a timing when the transmitted signal becomes the first threshold voltage or more, or the second threshold voltage or less is different from a timing when an absolute value of an amplitude of the reflected signal becomes maximum.

6. The communication system according to claim 1, comprising
a termination resistance connected between the other end of the second transmission line and a ground.

7. The communication system according to claim 6, wherein a value of the termination resistance is 40Ω or more and 60Ω or less.

8. The communication system according to claim 6, wherein a value of the termination resistance is equivalent to the output impedance of the transmission circuit.

9. The communication system according to claim 1, wherein the transmission signal is a square wave.

10. A communication system comprising:
a transmitting AC coupling element;
a first transmission line comprising one end connected to the transmitting AC coupling element;
a transmission circuit connected to an other end of the first transmission line and configured to transmit a transmission signal;
a receiving AC coupling element coupled to the transmitting AC coupling element using AC coupling;
a second transmission line comprising one end connected to the receiving AC coupling element; and a reception circuit connected to an other end of the second transmission line and configured to receive a reception signal via the receiving AC coupling element and the second transmission line, wherein the reception circuit comprises a hysteresis circuit having a hysteresis in input and output characteristics, the hysteresis circuit configured to compare the reception signal with a first threshold voltage and a second threshold voltage, the second threshold voltage being lower than the first threshold voltage, and configured to output output data according to the comparison result, the reception signal comprises a transmitted signal and a reflected signal, the transmitted signal being the transmission signal reached to the reception circuit without being reflected, the reflected signal being the transmission signal reached to the reception circuit after being reflected, and a delay time Td1 of the first transmission line and a delay time Td2 of the second transmission line are set so that, in an input of the reception circuit, a timing when the transmitted signal becomes the first threshold voltage or more, or the second threshold voltage or less is different from a timing when an absolute value of an amplitude of the reflected signal becomes maximum.

11. The communication system according to claim 10, wherein
the first threshold voltage is set as Vhyst[V],
a slew rate of the transmitted signal is set as SR[V/s],
a unit interval of the transmission signal is set as UI[s],
an absolute value of amplitude of the transmitted signal is set as Vamp[V],
N_UI is set as an integer multiple of UI, the integer being zero or more, and
the delay time Td1 and the delay time Td2 are set so that at least one of "2×Td1," "2×Td2," and "2(Td1+Td2)" is within a range from "N_UI+0.95×Vhyst/SR+0.5 UI−Vamp/SR" to "N_UI+1.05×Vhyst/SR+0.5 UI−Vamp/SR".

12. The communication system according to claim 11, wherein
the delay time Td1 and the delay time Td2 are set so that at least one of "2×Td1," "2×Td2," and "2(Td1+Td2)" becomes equivalent to "N_UI+Vhyst/SR+0.5 UI−Vamp/SR".

13. The communication system according to claim 10, wherein
the first threshold voltage is set as Vhyst[V],
a slew rate of the transmitted signal is set as SR[V/s],
a unit interval of the transmission signal is set as UI[s],
an absolute value of amplitude of the transmitted signal is set as Vamp[V],
N_UI is set as an integer multiple of UI, the integer being zero or more, and
the delay time Td1 and the delay time Td2 are set so that at least one of "2×Td1," "2×Td2," and "2(Td1+Td2)" becomes different from "N_UI+Vhyst/SR−Vamp/SR".

14. The communication system according to claim 10, wherein
the delay time Td1 and the delay time Td2 are set so that, in the input of the reception circuit, the absolute value of the amplitude of the reflected signal becomes minimum at a timing when the transmitted signal becomes the first threshold voltage or more, or the second threshold voltage or less.

15. The communication system according to claim 10, wherein the transmitting AC coupling element is a transmitting electrode,
the receiving AC coupling element is a receiving electrode,
the AC coupling is capacitive coupling,
characteristic impedances of the first transmission line and the second transmission line are greater than an output impedance of the transmission circuit, and
a coupling capacitance between the transmitting electrode and the receiving electrode is 10 pF or less.

16. The communication system according to claim 10, wherein
the transmitting AC coupling element is a transmitting electrode,
the receiving AC coupling element is a receiving electrode,
the AC coupling is capacitive coupling,
characteristic impedances of the first transmission line and the second transmission line are greater than an output impedance of the transmission circuit, and
the output impedance of the transmission circuit is 40Ω or more and 60Ω or less.

17. The communication system according to claim 10, wherein
the transmitting AC coupling element is a transmitting electrode,
the receiving AC coupling element is a receiving electrode,
the AC coupling is capacitive coupling, and
the communication system comprises a termination resistance connected between the other end of the second transmission line and a ground.

18. The communication system according to claim 11, wherein the transmission signal is a square wave.

19. A transmitter configured to perform communication with a receiver, the receiver comprising a receiving electrode, a second transmission line comprising one end connected to the receiving electrode, and a reception circuit connected to an other end of the second transmission line and configured to receive a reception signal via the receiving electrode and the second transmission line, the transmitter comprising:
a transmitting electrode capacitively coupled to the receiving electrode;
a first transmission line comprising one end connected to the transmitting electrode; and
a transmission circuit connected to an other end of the first transmission line and configured to transmit a transmission signal,
wherein characteristic impedances of the first transmission line and the second transmission line are greater than an output impedance of the transmission circuit.

20. A transmitter configured to perform communication with a receiver, the receiver comprising a receiving AC coupling element, a second transmission line comprising one end connected to the receiving AC coupling element, and a reception circuit connected to an other end of the second transmission line and configured to receive a reception signal via the receiving AC coupling element and the second transmission line, the reception circuit comprising a hysteresis circuit having a hysteresis in input and output characteristics, the hysteresis circuit configured to compare the reception signal with a first threshold voltage and a second threshold voltage, the second threshold voltage being lower than the first threshold voltage, and configured to output output data according to the comparison result, the transmitter comprising:

a transmitting AC coupling element coupled to the receiving AC coupling element using AC coupling;
a first transmission line comprising one end connected to the transmitting AC coupling element; and
a transmission circuit connected to an other end of the first transmission line and configured to transmit a transmission signal,
wherein the reception signal comprises a transmitted signal and a reflected signal, the transmitted signal being the transmission signal reached to the reception circuit without being reflected, the reflected signal being the transmission signal reached to the reception circuit after being reflected, and
a delay time Td1 of the first transmission line and a delay time Td2 of the second transmission line are set so that, in an input of the reception circuit, a timing when the transmitted signal becomes the first threshold voltage or more, or the second threshold voltage or less is different from a timing when an absolute value of an amplitude of the reflected signal becomes maximum.

\* \* \* \* \*